United States Patent
Biedermann et al.

(10) Patent No.: US 8,941,053 B1
(45) Date of Patent: Jan. 27, 2015

(54) HIGH DATA-RATE ATOM INTERFEROMETERS THROUGH HIGH RECAPTURE EFFICIENCY

(75) Inventors: Grant Biedermann, Albuquerque, NM (US); Akash Vrijal Rakholia, Albuquerque, NM (US); Hayden McGuinness, Albuquerque, NM (US)

(73) Assignee: Sandia Corporation, Albequerque, NM (US)

( * ) Notice: Subject to any disclaimer, the term of this patent is extended or adjusted under 35 U.S.C. 154(b) by 0 days.

(21) Appl. No.: 13/592,029

(22) Filed: Aug. 22, 2012

Related U.S. Application Data

(60) Provisional application No. 61/540,059, filed on Sep. 28, 2011.

(51) Int. Cl.
  *H05H 3/00* (2006.01)
  *G01V 7/00* (2006.01)
  *G21K 1/00* (2006.01)
  *H05H 3/02* (2006.01)

(52) U.S. Cl.
  CPC . *G21K 1/006* (2013.01); *H05H 3/02* (2013.01)
  USPC ......................................... 250/251; 356/450

(58) Field of Classification Search
  CPC ........... G01V 7/00; G01V 7/005; G01V 7/02; G01V 7/06; G01V 7/04; G01C 21/16; G21K 1/006; G21K 1/093; G21K 2201/06; G01P 15/00; G02B 2006/12159; G01J 9/02
  USPC ......... 250/251; 356/460, 450, 459, 28.5, 301, 356/484, 498; 73/382 G, 514.01, 514.27, 73/514.25
  See application file for complete search history.

(56) References Cited

U.S. PATENT DOCUMENTS

| | | | | |
|---|---|---|---|---|
| 4,992,656 | A * | 2/1991 | Clauser | 250/251 |
| 5,274,232 | A * | 12/1993 | Chu et al. | 250/251 |
| 7,030,370 | B1 * | 4/2006 | Crookston et al. | 250/251 |
| 8,288,712 | B2 * | 10/2012 | Bouyer et al. | 250/251 |
| 2013/0168541 | A1 * | 7/2013 | Stoner et al. | 250/251 |
| 2014/0022534 | A1 * | 1/2014 | Strabley et al. | 356/72 |

OTHER PUBLICATIONS

Muller et al. "A Compact Dual Atom Interferometer Gyroscope Based on Laser Cooled Rubidium" Eur. Phys. J. D. 53, 273-281 (2009).*

(Continued)

*Primary Examiner* — Brooke Purinton
(74) *Attorney, Agent, or Firm* — Martin I. Finston

(57) ABSTRACT

An inertial sensing system includes a magneto-optical trap (MOT) that traps atoms within a specified trapping region. The system also includes a cooling laser that cools the trapped atoms so that the atoms remain within the specified region for a specified amount of time. The system further includes a light-pulse atom interferometer (LPAI) that performs an interferometric interrogation of the atoms to determine phase changes in the atoms. The system includes a controller that controls the timing of MOT and cooling laser operations, and controls the timing of interferometric operations to substantially recapture the atoms in the specified trapping region. The system includes a processor that determines the amount inertial movement of the inertial sensing system based on the determined phase changes in the atoms. Also, a method of inertial sensing using this inertial sensing system includes recapture of atoms within the MOT following interferometric interrogation by the LPAI.

20 Claims, 5 Drawing Sheets

(56) References Cited

OTHER PUBLICATIONS

G. G Biedermann, "Gravity tests, differential accelerometry and interleaved clocks with cold atom interferometers," Ph.D. thesis, Stanford University (2007).*

Technical Specification Sheet from Innovative Integration for SBC6711, stand alone supercontroller DSP.*

Butts, D. et al., "Light pulse atom interferometry at short interrogation times", J Opt Soc Am B 28(3), Mar. 2011; 416-421.

* cited by examiner

HIGH DATA-RATE ATOM INTERFEROMETERS THROUGH HIGH RECAPTURE EFFICIENCY

CROSS-REFERENCE TO RELATED APPLICATIONS

This application claims priority to U.S. Provisional Patent Application Ser. No. 61/540,059, filed on Sep. 28, 2011, entitled "High data-rate atom interferometers through high recapture efficiency," which is incorporated herein by reference in its entirety.

This invention was developed under Contract DE-AC04-94AL85000 between Sandia Corporation and the U.S. Department of Energy. The U.S. Government has certain rights in this invention.

TECHNICAL FIELD

Embodiments described herein are directed to inertial sensing systems that implement high data-rate light-pulse atom interferometers (LPAIs), and, more particularly, to inertial sensing systems that implement high data-rate LPAIs in which atoms are recaptured between measurements.

BACKGROUND

Since the inception of the LPAI in 1991, the field has matured to the point where atom interferometers are poised to significantly advance applications in gravimeter surveys, seismic studies, inertial navigation, and tests of fundamental physics. Typically, LPAIs operate at a rate on the order of 1-2 Hz, or less. Indeed, because interferometer phase shift scales quadratically with temporal duration, interferometers prefer low data-rates using long interrogation times to achieve the highest sensitivity. This slow data rate, however, is insufficient for many applications.

BRIEF SUMMARY

Embodiments described herein are directed to inertial sensing systems and methods. In one embodiment, an inertial sensing system includes a magneto-optical trap (MOT) that is configured to trap multiple atoms within a specified trapping region for a first specified amount of time. The inertial sensing system also includes a cooling laser that is configured to cool the trapped atoms so that the atoms remain within the specified region for the first specified amount of time. The inertial sensing system also includes a light-pulse atom interferometer (LPAI) configured to perform an interferometric interrogation of the atoms for a second specified amount of time after the first specified period of time has elapsed to determine phase changes in the atoms. Next, the inertial sensing system includes a controller that controls the timing of MOT operations and cooling laser operations according to the first specified amount of time, and controls the timing of interferometric operations according to the second specified amount of time to substantially recapture the atoms in the specified trapping region. Still further, the inertial sensing system includes a processor that determines the amount of inertial movement of the inertial sensing system based on the determined phase changes in the atoms.

In another embodiment, a method for sensing inertial movement is provided. The method includes trapping multiple atoms within a specified trapping region for a first specified amount of time and cooling the trapped atoms so that the atoms remain within the specified region for the first specified amount of time. Next, the method includes halting the atomic trapping and cooling for a second specified amount of time, and performing an interferometric interrogation on the atoms for a third specified amount of time to determine phase changes in the atoms that occurred during the second specified amount of time. Next, the method includes controlling the timing of MOT operations and cooling laser operations according to the specified first amount of time, and controlling the timing of interferometric operations according to the third specified amount of time to recapture the atoms in the specified trapping region. The method also includes determining the amount of inertial movement based on the determined phase changes in the atoms.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Embodiments described herein are directed to inertial sensing systems and methods. In one embodiment, an inertial sensing system includes a MOT that is configured to trap multiple atoms within a specified trapping region for a first specified amount of time. The inertial sensing system also includes a cooling laser that is configured to cool the trapped atoms so that the atoms remain within the specified region for the first specified amount of time. The inertial sensing system also includes a LPAI configured to perform an interferometric interrogation of the atoms for a second specified amount of time after the first specified period of time has elapsed to determine phase changes in the atoms. Next, the inertial sensing system includes a controller that controls the timing of MOT and cooling laser operations according to the first specified amount of time, and controls the timing of interferometric operations according to the second specified amount of time to substantially recapture the atoms in the specified trapping region. Still further, the inertial sensing system includes a processor that determines the amount inertial movement of the inertial sensing system based on the determined phase changes in the atoms.

In another embodiment, a method for sensing inertial movement is provided. The method includes trapping multiple atoms within a specified trapping region for a first specified amount of time and cooling the trapped atoms so that the atoms remain within the specified region for the first specified amount of time. Next, the method includes halting the atomic trapping and cooling for a second specified amount of time, and performing an interferometric interrogation on the atoms for a third specified amount of time to determine phase changes in the atoms that occurred during the second specified amount of time. Next, the method includes controlling the timing of MOT and cooling laser operations according to the specified first amount of time, and controlling the timing of interferometric operations according to the third specified amount of time to recapture the atoms in the specified trapping region. The method also includes determining the amount of inertial movement based on the determined phase changes in the atoms.

Figure 1:
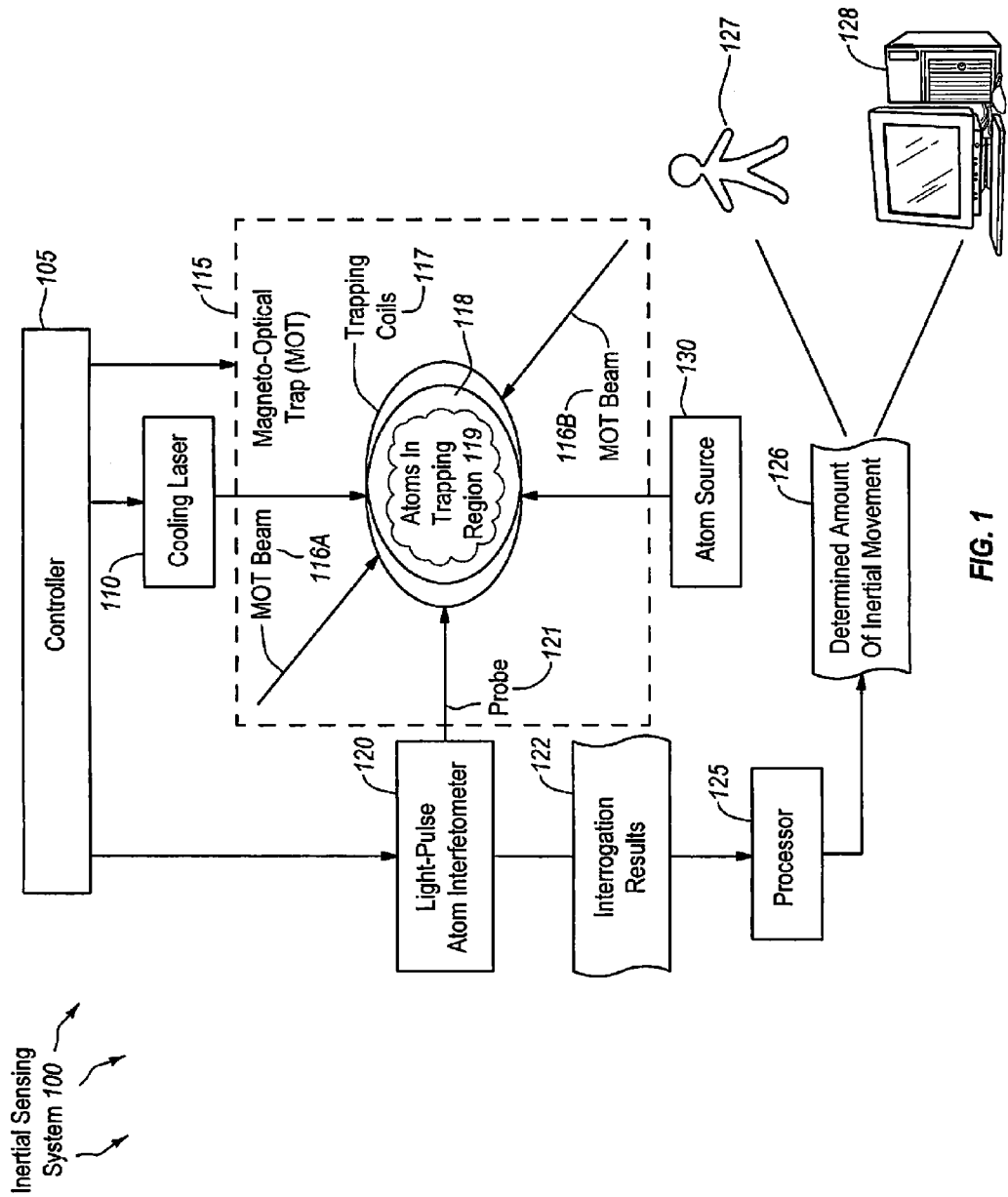
FIG. 1 illustrates system architecture of an embodiment of an inertial sensing system.
Figure 2:
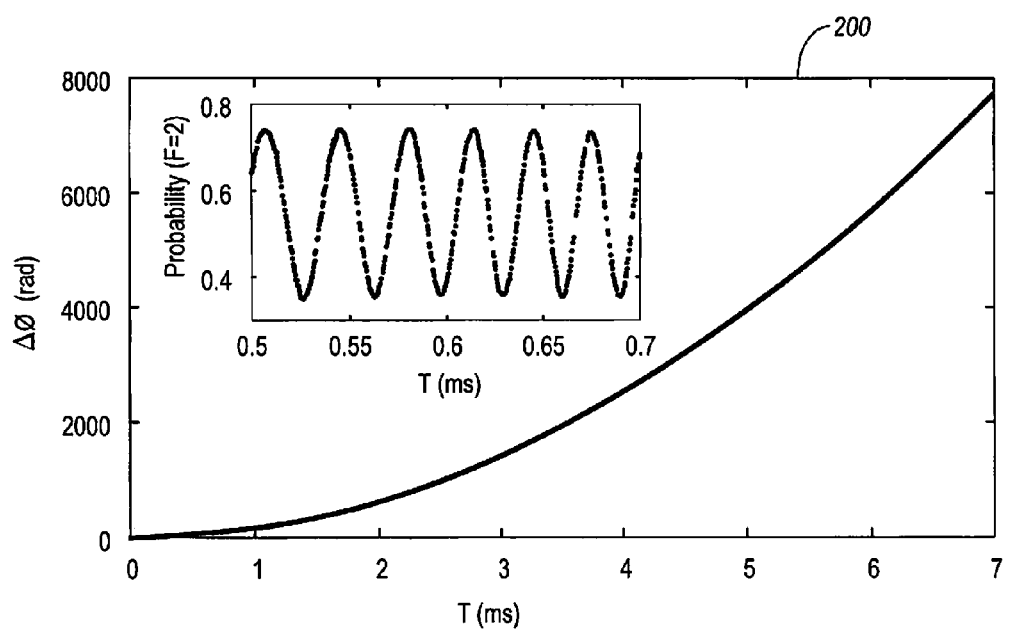
FIG. 2 illustrates a determination of gravity by measuring phase shift versus interrogation time.
Figure 3:
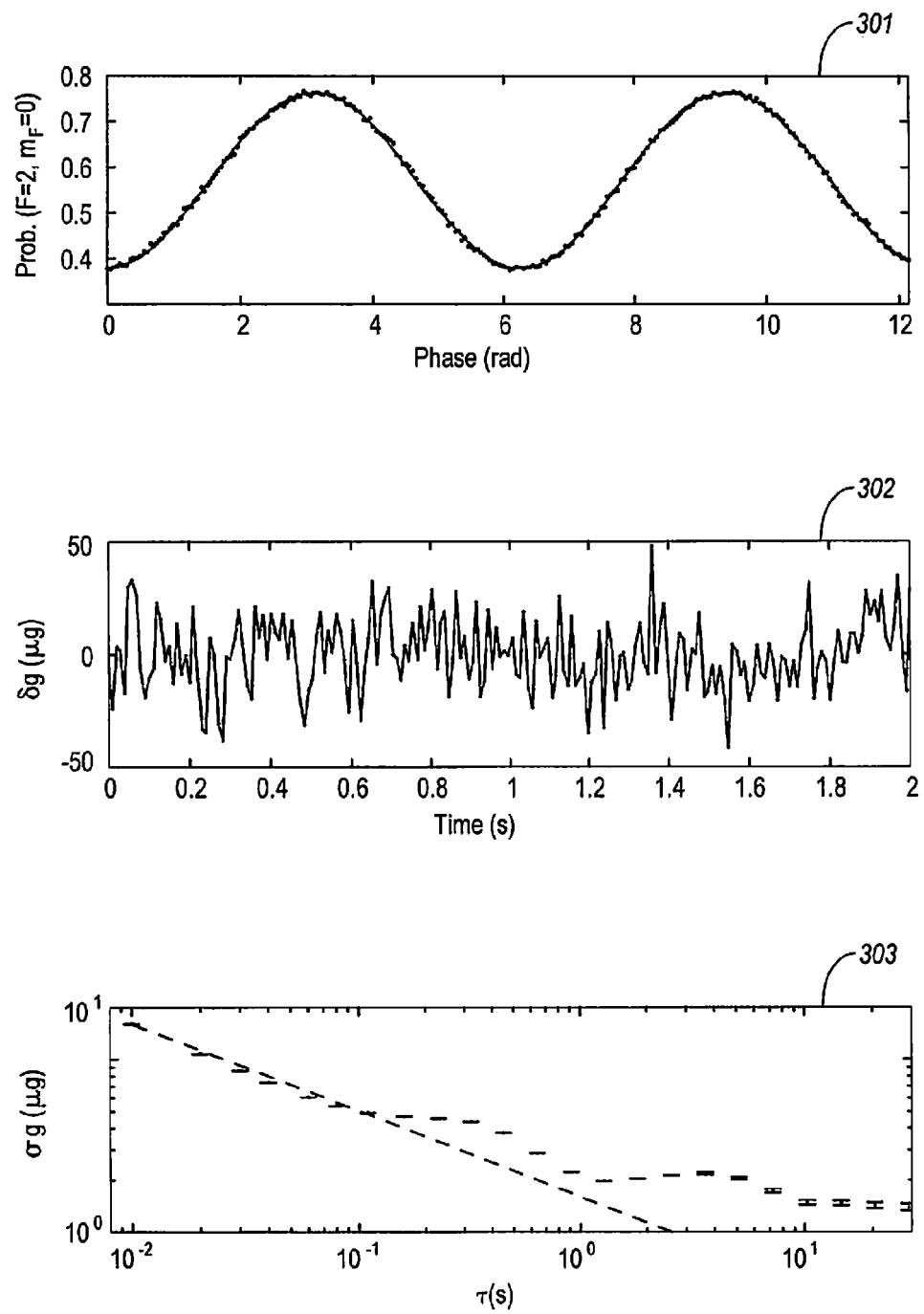
FIG. 3 illustrates various measurements generated in an example embodiment.

As shown in FIG. 1, an inertial sensing system 100 is provided which determines acceleration changes based on relative phase changes in atoms. The inertial sensing system includes a MOT 115 configured to trap multiple atoms (e.g. atom cloud 119) within a specified trapping region 118. The number of atoms trapped may vary based on which components are used in the inertial sensing system 100, as well as the size of the components used. The number of atoms is sufficient to allow a LPAI 120 to obtain an accurate reading of phase changes in the atoms due to acceleration in one direction or another. These phase changes occur when the atoms are in free fall for a very short amount of time (specific times will be enumerated below). Before the atoms are allowed to go into free fall however, the atoms are first trapped within the MOT 115 for a specified amount of time.

The MOT 115 includes one or more trapping coils 117 that trap the atoms 119 within the specified region 118. The region may vary in size based on the number of atoms used, the size and/or intensity of the MOT beams 116A and 116B, the size and intensity of the cooling laser 110 and various other components. The cooling laser 110 may be any known or currently unknown type of laser that can be used to cool atoms. A beam of the cooling laser 110 may be directed on to the group of atoms 119 in the trapping region 118 to cool the atoms. In some cases, the atoms may be cooled to between 10 and 1 degree(s) $\mu K$ (starting from, for example, 100 degrees $\mu K$). Cooling the atoms lowers their overall movement and, thus, keeps them from moving outside the specified trapping region 118. In some embodiments, as will be explained further below, polarization gradient cooling may be used to cool the atoms and aid in atom recapture. The atoms may be cooled for a specified amount of time, as controlled by the controller 105.

After the atoms have been trapped by the MOT 115 within the trapping region 118 and cooled by the cooling laser 110, under the direction of the controller 105, the MOT and the cooling laser are turned off for a specified amount of time, allowing the atoms to go into free fall (due to gravity). During this time the inertial system 100 as a whole is subject to accelerations or movements (e.g. when the inertial system is attached to a car or an airplane). Shortly after going into free fall, the atoms are interrogated by the LPAI 120. The LPAI interrogates the atoms using a probe laser 121 to determine phase changes that have occurred in the atoms due to movement of the inertial system 100. The results of the interrogation 122 are provided to a processor 125 which determines the amount of inertial movement of the inertial sensing system 100 based on the determined phase changes in the atoms 119.

The controller 105 controls the timing of MOT and cooling laser operations according to a first specified amount of time so that the atoms are trapped and retained in an effective manner. Moreover, the controller 105 controls the timing of LPAI interferometric operations so that the system can substantially recapture the atoms 119 within the specified trapping region 118. Because few atoms exit the trapping region 118, the LPAI's interferometric interrogations can occur at a higher rate. For instance, in some cases, the interrogations can occur every 1-5 milliseconds. Thus, the controller 105 can control the timing of the MOT, the cooling laser and interferometric operations so that a determination of inertial movement can be made at rates of 50 Hz, 100 Hz, 200 Hz, 300 Hz, higher than 300 Hz, about 50 Hz to about 300 Hz, or about 100 Hz to about 200 Hz.

Within the magneto-optical trap 115, the atoms 119 can be reloaded within the specified region within 1-5 milliseconds in some embodiments. The MOT can be specially tuned such that these reloads can occur very quickly (e.g. every 1-5 milliseconds). The reloading also includes feeding in new atoms from an atom source 130. New atoms are provided to replenish those atoms that exit the specified region (in most cases, while 90-95% of the atoms can be re-trapped, some will avoid the trap and escape).

The time used by the LPAI for interrogation may also be relatively quite brief. The LPAI 120 may interrogate the atoms 119 trapped within the specified trapping region 118 for between 5-15 milliseconds in some embodiments. Thus, interrogation time may be decreased from (in some cases 100 ms) to around 10 ms, which corresponds to a repetition rate of 100 Hz. This, in addition to the short reloading time by the MOT, allows determinations of inertial movement to be made at a much higher rate (e.g. between 50-350 Hz). Such high inertial sensing rates allow the inertial sensing system 100 to provide inputs for navigation systems, seismic monitoring systems and other systems which require high sensitivity and high accuracy. The detected accelerations or movements may provide an indication to the navigation of where the device is moving, even in cases where global positioning system (GPS) is not available.

Additional details will be provided below with regard to FIGS. 2-5, with continued reference to FIG. 1. In some embodiments, as mentioned above, the interrogation time for the LPAI is very short. In such cases, the gravitational displacement during the time in which the atoms are falling (e.g. the time of flight (TOF)) is less than the MOT size, corresponding to 10 ms for a 1 mm diameter atom cloud. Having a small displacement allows the interferometer atoms to be recaptured with high efficiency and drastically reduces the measurement dead time associated with replenishing the trap atoms 119. This enables an increase in data rate by one to two orders of magnitude and achieves short-term sensitivities comparable to other demonstrations targeting field use (e.g. in navigation systems). In addition, a short cycle time reduces atomic motion and laser-atom interaction volume (approximately 1 cm$^3$ versus tens to hundreds of cm$^3$ in past implementations) and, in principle, enables operation at any orientation with respect to gravity.

In some embodiments, the LPAI 120 may use stimulated Raman transitions in a $\pi/2$-$\pi$-$\pi/2$ pulse sequence. This sequence utilizes stimulated photon recoil to coherently separate the atomic wavepackets spatially, redirects the wavepackets toward one another, and finally interferes the formerly separate wavepackets. In a nearly uniform gravitational field, the dominant phase shift comes from interaction with the light. Each pulse imprints its spatial phase $\phi i$ on the atoms, inducing a cumulative phase shift $\Delta\phi=\phi_1-2\phi_2+\phi_3$ between the ground and excited states. The value of this phase shift determines the relative population of the two states upon detection through $P=1/2(1-\cos(\Delta\phi))$. This phase shift is proportional to the acceleration of the atoms along the effective wavevector k such that $a_k=(\Delta\phi/kT^2)$, where T is the free evolution interrogation time between pulses. Through the measurement of the ground and excited state populations, $\Delta\phi$ is measured, and the acceleration $a_k$ can be determined. This technique can be used to measure local gravity and the inertial sensing system's inherent sensitivity by propagating the Raman fields parallel to gravity.

In some embodiments, the LPAI 120 may be placed within a miniature quartz vacuum cell having outer dimensions of for example, 14×16×80 mm³ with a pressure of for example, 6×10⁻⁹ Torr. Within such a cell, the MOT 115 may be loaded with atoms (e.g. from atom source 130) at a rate of, for example, 1×10⁷ atoms/s from a background vapor of Rubidium (Rb) 87 atoms. The axial magnetic field gradient of the quadrupole coils (e.g. coils 117) is estimated to be 8 G/cm. The trapping beams (e.g. 116A and 116B) may be at 780 nm, and are red detuned from an F=2→F'=3 cycling transition by 9 MHz. The beams may be collimated, having a 1/e² diameter of 5.2 mm and a combined peak intensity of 182 mW/cm² (saturation parameter of $s_0$=108) after passing through the cell. MOT parameters may be optimized for high recapture efficiency and short recapture duration. To prevent accumulation in the dark state F=1, 0.5 mW of repump light resonant with the F=1→F'=2 transition is directed at the atoms. It should be understood that, while precise numbers have been provided in the example embodiment described above, these numbers represent only one example of the many different parameter values which may be used to produce a desired result.

At the start of the interferometer cycle, the MOT atoms 119 are sub-Doppler cooled for (e.g. 1 ms) to approximately 5.5 μK. A 1.5 G bias field may then be applied along the Raman beam axis to split the Zeeman degeneracy and define a quantization axis. The atoms are then prepared in the F=1 manifold with a depump pulse of (e.g. 100 μs) duration resonant with the F=2→F'=2 transition. This state preparation distributes the population in the F=1 manifold with (e.g. 43) percent in the m=0 sublevel and the rest nearly evenly distributed in the m=±1 sublevels. A large bias field may be used to shift the ±1 sublevels out of resonance with the interferometer beam tuned to the clock transition F=1, m=0→F=2, m=0. Even though the atoms in these levels do not participate in the interferometer and may add a small amount of background noise during detection, they are easily recaptured, allowing for shorter atom collection time. After depumping, the atoms are interrogated with the Raman beams (e.g. probe 121).

The Raman laser in the LPAI 120 may be seeded by an external cavity diode laser locked 1.23 GHz red of the F=2→F'=3 transition. Two phase-coherent laser fields may be generated that are separated in frequency by the hyperfine splitting by injection, locking two uncoated laser diodes with the output of a fiber electro-optic modulator driven at (e.g. 6.835 GHz). One of the diodes is tuned to predominately amplify the positive sideband while the other is tuned to amplify the carrier. The two beams are then coupled onto orthogonal axes of the same polarization maintaining fiber, delivered to the sensor-head, then separated and directed so that the positive sideband (carrier) field is incident down (up) upon the atoms. The beams are collimated to a 1/e² diameter of 5.5 mm, and may demonstrate a Rabi frequency of $\Omega_{eff}=2\pi\times161$ kHz. The pulse duration is controlled with the controller 105 (e.g. a field-programmable gate array or other programmable logic circuit) having a specified (e.g. 20 ns) resolution. The frequency of the positive sideband may be increased at a rate of k*g=2π×25.1 kHz/ms to compensate for the Doppler shift the atoms experience due to gravitational free-fall.

Following the interferometer sequence, the population in F=2 and the total atom number may be detected by light induced fluorescence from two sequential detection pulses, each (e.g. 100 μs) in duration. During the pulses, some percent (e.g. 1-2%) of the fluorescence is collected into an avalanche photodiode. The first pulse consists of a detection beam resonant with the F=2→F'=3 cycling transition, thus measuring the population in F=2. The second pulse consists of the detection beam and the repump beam, measuring the total population, including the spectator atoms. The detection beam may be retro-reflected to balance the scattering force. The atoms are then recaptured in the MOT 115 and the cycle is immediately repeated. The interferometer operates in a continuous loop, recapturing the atoms from one interferometer measurement for use in the next. Loading from background vapor replaces lost atoms and, at least in some cases, an average equilibrium atom number of approx. 2×10⁵ may be obtained after optimizing for sensitivity.

As explained above, efficient atom recapture allows for the majority of the atoms (approximately 85 to 95 percent or more, depending on the data rate and TOF), to be reused from cycle to cycle. With this method, the equilibrium atom number may be achieved in 1 to 2 ms. At least in some embodiments, this recapture duration is consistent with a calculated characteristic restoring time of approx. 1.8 ms for MOT parameters. Attaining a similar atom number loading from only vapor might, for example, take on the order of 20 ms in the inertial sensing system 100, limiting the maximum theoretical data rate to approximately 50 Hz. Efficient recapture is made possible due to sufficient sub-Doppler cooling. Because of this cooling, the atoms only fall a few hundred microns during the relatively short TOF, so that most of the atoms never travel outside the MOT trapping region 118. These higher rates with shorter TOFs lead to an even smaller displacement from the trap center, increasing recapture efficiency.

To verify the interferometer response to accelerations, the value of gravity may be determined by measuring the interferometric phase shift as a function of the interrogation time. The phase shift in *radians* is shown as a function of time in FIG. 2, from 0 to 7 ms. The data is fit to a chirped sinusoid, of which the mid-fringe intercepts are shown, and yields a value of g=9.7916378±9.7×10⁶ m/s². The inset shows a portion of raw data, renormalized to exclude the signal from spectator atoms, where its chirped nature is apparent. Depending on the sensitivity desired, the processor 125 may take into account (or not take into account) the Doppler shift undergone by the atoms during each cycle. This may affect the determined amount of inertial movement 126 output by the processor.

In one embodiment, the sensitivity of the inertial sensing system 100 may be determined when running at 100 Hz. The 100 Hz data rate represents a favorable trade-off in terms of being fast enough for many navigation applications but which also exhibits a desired level of sensitivity. Parameters such as sub-Doppler cooling and recapture durations may be optimized to achieve the greatest sensitivity. FIG. 3A shows a fringe pattern obtained by scanning the relative phase of the Raman beams between pulses. To attain good statistics, 12,000 data points were taken mid-fringe. Two-sample Allan deviation of the acceleration signal may be used to determine the shot-to-shot sensitivity $\sigma_g=(\delta\phi_g/g_k k)(1/T^2)$, where $\delta\phi_g$ is the uncertainty in the value of $\Delta\phi$ shot-to-shot (see FIGS. 3A and 3B). The short term sensitivity is provided, accounting for data rate by $\sigma_s=\sigma_g/\sqrt{R}$, where R is the data rate, which yields 1.6 µg/√Hz in this case. As expected, the Allan deviation, shown in FIG. 3C, generally decreases with increasing time, although there are two noticeable deviations from this trend centered at about 0.3 and 4 seconds (most likely due to technical noise).

Figure 4:
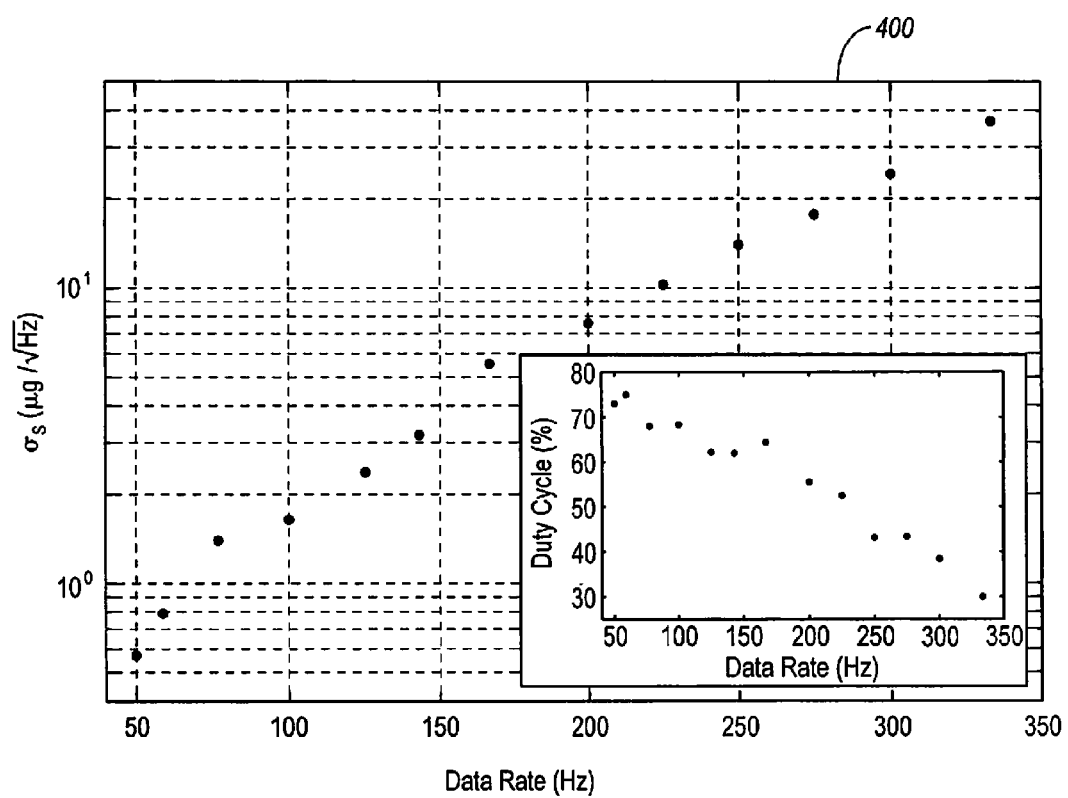
FIG. 4 illustrates a plot of short-term sensitivity versus data rate.

Using the same methods as in the 100 Hz example above, the performance of the inertial sensing system 100 can be examined for data rates of 50 Hz to 330 Hz (or more). FIG. 4 shows the achieved sensitivity, while the inset plots the duty cycle (the ratio of the total interrogation time, 2T, and cycle time), for that range. The sensitivity monotonically increases with increasing date rate, having values of 0.57 µg/√Hz to 36.7 µg/√Hz at 50 Hz and 330 Hz, respectively. The corresponding duty cycle varies from (e.g. 75 to 30 percent) from 50 Hz to 330 Hz, respectively. At high data rates, the optimal sub-Doppler and recapture durations make up a larger fraction of the cycle time, leaving less time for interrogation. Furthermore, the increase in data rate only partially compensates for the reduced interrogation time, which may lead to a reduction in sensitivity.

As such, a high data-rate atom interferometer inertial sensing system may be provided. The interferometer may operate at rates between 50 Hz and 330 Hz (or higher), having sensitivities suitable for many gravimeter, seismic, and inertial navigation applications. These high data rates and small sensor-head sizes result from optimizing the system for high atom recapture efficiency (in some cases 85 to 95 percent), which allows for a significantly shorter loading time than in many other LPAI systems. In some embodiments, the sensor head of the LPAI may be enclosed in a magnetic shield to block ambient magnetic fields. Increasing the stability of the Raman beam may also reduce the overall noise and allow the LPAI to approach a sensitivity at the level of 100 ng/√Hz at 100 Hz for an atom number of $2\times10^5$.

Figure 5:
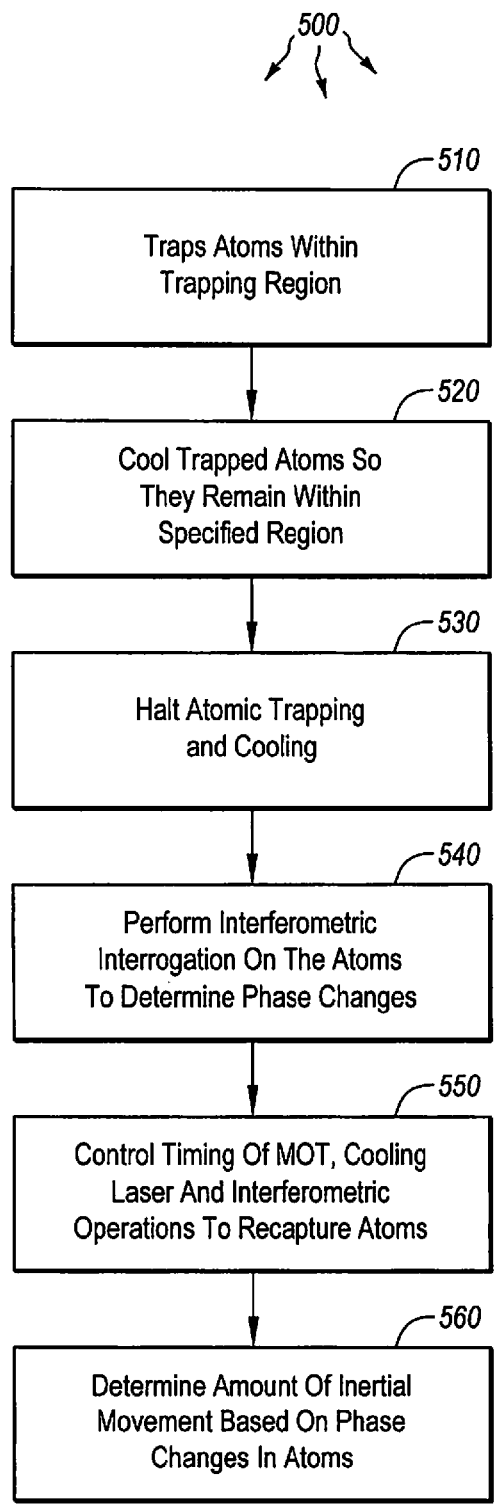
FIG. 5 illustrates a flowchart of an embodiment for sensing inertial movements.

In FIG. 5, a method 500 is provided for performing inertial sensing. This method will be described in relation to the inertial sensing system 100 of FIG. 1. The method 500 includes step 510 in which a group of atoms is trapped within a specified trapping region 118 for a first specified amount of time. The atoms may be Rubidium 87 atoms or any other atoms that can be trapped, cooled and interrogated by an atom interferometer. Next, method 500 includes step 520 in which the trapped atoms 119 are cooled by cooling laser 110. The trapped atoms remain within the specified region during the first specified amount of time. The trapping and cooling of the atoms is halted for a second specified amount of time in step 530, during which the atoms are in free fall.

The LPAI 120 performs an interferometric interrogation in step 540 on the atoms for a third specified amount of time to determine phase changes in the atoms that occurred during the second specified amount of time (i.e. during the time the atoms were in free fall). The timing of MOT and cooling laser operations is controlled by the controller in step 550 according to the specified first amount of time. As such, the MOT traps the atoms and the cooling laser cools the trapped atoms for the duration of the first specified amount of time (this amount of time is configurable by an operator or other user). The controller also controls the timing of LPAI interferometric operations according to the third specified amount of time to substantially recapture the atoms after they are allowed to go into free fall in the specified trapping region. The LPAI's inteferometric operations result in atomic phase shift results 122 which are sent to a processor. The processor determines, in step 560, the amount of inertial movement experienced by the inertial sensing system 100 based on the determined phase changes in the atoms. This process is repeated indefinitely, providing a constantly updating indication of inertial movement. This determined amount of movement 126 may be transferred to a user 127 or other party, to a computer system 128, to an internal memory within the inertial sensing system or to another location (e.g. to a remote computer system over a computer network such as the internet). In this manner, highly precise, highly accurate inertial movements may be provided and used in a wide variety of applications.

Although illustrated and described herein with reference to certain specific embodiments, the present invention is nevertheless not intended to be limited to the details shown. Rather, various modifications may be made in the details within the scope and range of equivalents of the claims and without departing from the invention.

We claim:

1. An inertial sensing system, comprising:
    a three-dimensional magneto-optical trap (3D-MOT) configured to trap a plurality of atoms directly from an atomic vapor within a specified trapping region for a first specified amount of time;
    a cooling laser configured to cool the plurality of trapped atoms such that the atoms substantially remain within the specified trapping region for the first specified amount of time;
    a light-pulse atom interferometer configured to perform an interferometric interrogation of the plurality of atoms for a second specified amount of time after the first specified period of time has elapsed to determine phase changes in the atoms;
    a controller that controls the timing of 3D-MOT and cooling laser operations according to the first specified amount of time, and controls the timing of interferometric operations according to the second specified amount of time to substantially recapture, directly from the atomic vapor, the plurality of atoms in the specified trapping region; and
    a processor that determines an amount of inertial movement of the inertial sensing system based on the determined phase changes in the plurality of atoms;
    wherein the system comprises at least one laser configured to distribute the atoms within the interaction volume between participant atoms excited to an atomic state that participates in the interferometer and spectator atoms excited to at least one atomic state that does not participate in the interferometer;
    wherein the system is configured such that during the interferometric interrogation, there is a population of atoms within the interaction volume that includes both the participant atoms and the spectator atoms; and
    wherein the system comprises a magnetic circuit configured to apply a magnetic bias field within the interaction volume that is effective to tune the spectator atomic states away from resonance during the interferometric interrogation.

2. The inertial sensing system of claim 1, wherein the controller is configured to control the timing of the MOT, cooling laser and interferometric operations such that a determination of inertial movement can be made by the processor on a specified periodic basis.

3. The inertial sensing system of claim 2, wherein the processor is configured to determine the inertial movements at, or less than, every 20 milliseconds.

4. The inertial sensing system of claim 2, wherein the determined inertial movements are transferred to a navigation system.

5. The inertial sensing system of claim 4, wherein the navigation system is configured to provide an indication of relative movement of the inertial sensing system over a specified period of time.

6. The inertial sensing system of claim 2, wherein the determined inertial movements are transferred to a seismic monitoring system that indicates seismic activity over time.

7. The inertial sensing system of claim 1, wherein the cooling laser is configured to cool the plurality of atoms using polarization gradient cooling.

8. The inertial sensing system of claim 7, wherein the cooling laser is configured to cool the plurality of atoms to between 10 and 1 degrees µK.

9. The inertial sensing system of claim 1, wherein the plurality of atoms is substantially reloaded in the specified region of the MOT within a range of 1-5 milliseconds.

10. The inertial sensing system of claim 9, wherein the MOT is tuned such that each subsequent reload of atoms within the specified region of the MOT occurs in the range of 1-5 milliseconds.

11. The inertial sensing system of claim 1, wherein the MOT is tuned such that 90-95% of the plurality of atoms is re-trapped for the next cycle.

12. The inertial sensing system of claim 1, wherein a plurality of additional atoms is fed into the MOT from an atom source during each cycle.

13. The inertial sensing system of claim 1, wherein the second specified period of time during which the light-pulse atom interferometer interrogates the plurality of atoms trapped within the specified trapping region lies between 5-15 milliseconds.

14. A method for sensing inertial movement, comprising:
trapping a plurality of atoms, directly from an atomic vapor, within a specified trapping region for a first specified amount of time;
cooling the plurality of trapped atoms such that the atoms substantially remain within the specified trapping region for the first specified amount of time;
halting the atomic trapping and cooling for a second specified amount of time;
performing an interferometric interrogation on the plurality of atoms for a third specified amount of time to determine phase changes in the atoms that occurred during the second specified amount of time;
controlling the timing of a three-dimensional magneto-optical trap and cooling laser operations according to the specified first amount of time and controlling the timing of interferometric operations according to the third specified amount of time to substantially recapture, directly from the atomic vapor, the plurality of atoms in the specified trapping region; and
determining an amount of inertial movement based on the determined phase changes in the plurality of atoms;
wherein:
the interferometric interrogation is performed on a population of atoms distributed, within an interaction volume, between participant atoms excited to an atomic state that participates in the interferometric interrogation and spectator atoms excited to at least one atomic state that does not participate in the interferometric interrogation, and
the method further comprises using a magnetic bias field applied within the interaction volume to tune the spectator atomic states away from resonance during the interferometric interrogation.

15. The method of claim 14, wherein the amount of inertial movement is determined at a specified periodic rate of at least 50 Hz.

16. The method of claim 14, wherein the amount of inertial movement is determined at a specified periodic rate in the range of 50-100 Hz.

17. The method of claim 14, wherein the amount of inertial movement is determined at a specified periodic rate in the range of 100-200 Hz.

18. The method of claim 14, wherein the amount of inertial movement is determined at a specified periodic rate in the range of 200-300 Hz.

19. The method of claim 14, wherein the amount of inertial movement is determined at a specified periodic rate of at least 300 Hz.

20. An inertial sensing system, comprising:
a three-dimensional magneto-optical trap (3D-MOT) configured to trap a plurality of atoms, directly from an atomic vapor, within a specified trapping region for a first specified amount of time;
a cooling laser configured to cool the plurality of trapped atoms such that the atoms substantially remain within the specified trapping region for the first specified amount of time;
a light-pulse atom interferometer configured to perform an interferometric interrogation of the plurality of atoms for a second specified amount of time after the first specified period of time has elapsed to determine phase changes in the atoms;
a controller that controls the timing of 3D-MOT and cooling laser operations according to the first specified amount of time and controls the timing of interferometric operations according to the second specified amount of time to substantially recapture, directly from the atomic vapor, the plurality of atoms in the specified trapping region; and
a processor that determines the amount inertial movement of the inertial sensing system based on the determined phase changes in the plurality of atoms,
wherein the controller controls the timing of the 3D-MOT, cooling laser and interferometric operations such that a determination of inertial movement is made by the processor on a specified periodic basis that is at, or less than, every 20 milliseconds; and
wherein the system comprises at least one laser configured to distribute the atoms within the interaction volume between participant atoms excited to an atomic state that participates in the interferometer and spectator atoms excited to at least one atomic state that does not participate in the interferometer,
wherein the system is configured such that during the interferometric interrogation, there is a population of atoms within the interaction volume that includes both the participant atoms and the spectator atoms, and
wherein the system comprises a magnetic circuit configured to apply a magnetic bias field within the interaction volume that is effective to tune the spectator atomic states away from resonance during the interferometric interrogation.

* * * * *